United States Patent Office 3,280,132
Patented Oct. 18, 1966

3,280,132
PROCESS FOR THE PRODUCTION OF
HOMOYOHIMBONES
John Shavel, Jr., Mendham, and Harold Zinnes, Rockaway, N.J., assignors to Warner-Lambert Pharmaceutical Company, Morris Plains, N.J., a corporation of Delaware
No Drawing. Filed Jan. 28, 1964, Ser. No. 340,794
4 Claims. (Cl. 260—288)

This invention relates to a new and novel process for the production of yohimbone derivatives. More particularly, this invention relates to a new and novel process for the production and separation of homoyohimbones of the formula:

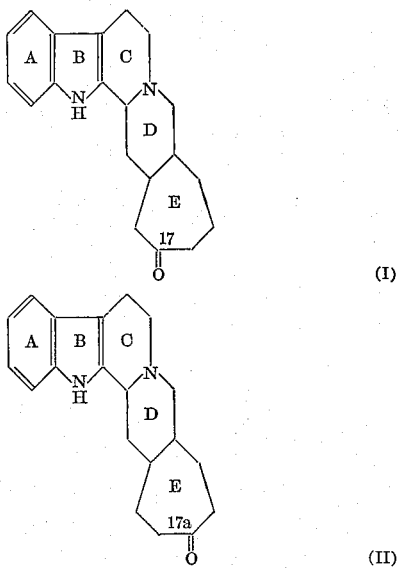

This invention also encompasses within its scope novel intermediates useful for the production of these homoyohimbones. The homoyohimbones, as new compounds, form the subject matter of U.S. Patent No. 2,975,184.

The compounds have signifiant pharmacological activity and are useful as tranquilizers, hypotensive and adrenolytic agents.

The preparative method for the novel compounds disclosed in the aforesaid patent involves the expansion of Ring E of yohimbone from a 6 to a 7 carbon atom carbocyclic ring by reacting yohimbone with diazomethane or with a monosubstituted diazomethane.

According to the present invention, we have now found that these compounds may be prepared by a new and improved method which possesses considerable advantage over the only preparative route heretofore known. By our present novel procedure, we can obtain the same 50–50 mixture of homoyohimbones without the necessity using the highly toxic and explosive diazomethane as required by prior methods. In addition, we have now developed an efficient and economical procedure for the separation of the respective homoyohimbones formed from the 50–50 mixture of isomers obtained as the primary reaction product.

Briefly, the present invention involves utilizing yohimbone as the starting material. By reacting yohimbone with acetone cyanohydrin followed by treatment with hydrochloric acid, we obtain yohimbone cyanohydrin hydrochloride of the formula:

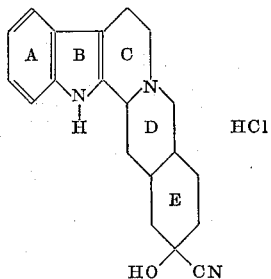

Recrystallization may be advantageously effected by dissolving the crude yohimbone cyanohydrin in methanol containing about 1 to 5% acetone cyanohydrin.

The free yohimbone cyanohydrin base may be obtained by dissolving yohimbone cyanohydrin hydrochloride in a mixture of water and methanol and reacting the hydrochloride in the solution with potassium cyanide. The crude yohimbone cyanohydrin base is recovered as an insoluble precipitate.

The next step involves the preparation of 17-hydroxy-17-aminomethylyohimbone by catalytic hydrogenation of yohimbone cyanohydrin hydrochloride with gaseous hydrogen under pressure, for example, 50 lb./sq. in ch gauge, in the presence of a catalyst such as platinum dioxide. The reaction is carried out in a solvent such as methanol containing about 5 to 10% hydrochloric acid. The hydrogenated reaction product is recovered by filtering off the catalyst, neutralizing the excess acid and evaporating the solvent in vacuo.

The final step in our novel procedure involves the preparation of the homoyohimbones from pure 17-hydroxy-17-aminomethylyohimbone.

This preparation is carried out by treating the starting 17-hydroxy-17-aminomethylyohimbone with sodium nitrite in the presence of 10% aqueous solution of acetic acid which has been cooled to about 10° C. The reaction mixture is made alkaline and the product is isolated by extraction with chloroform. The chloroform extract contains the isomeric mixture of homoyohimbones I and II.

An alternate pathway for preparing homoyohimbone may be followed which avoids isolation of the intermediate 17-hydroxy-17-aminomethylyohimbone. Thus, the yohimbone cyanohydrin hydrochloride may be directly hydrogenated as described above and the hydrogenated product treated with sodium nitrite in the presence of 10% aqueous acidic acid. The desired reaction product is then extracted as described in the above procedure.

The isomeric mixture is recrystallized from methylethyl ketone to give a crystalline product which is very rich in that component which is observed to move faster on paper chromatography. Further recrystallization from methylethyl ketone and methanol gives the pure and fast-moving homoyohimbone.

By concentration of the methylethyl ketone filtrate, an intermediate fraction is obtained. The product in the remaining filtrate, which is rich in the slower moving component, is then purified by extraction with ether and recrystallization from methanol.

The foregoing reaction steps may be conveniently illustrated by the following diagram:

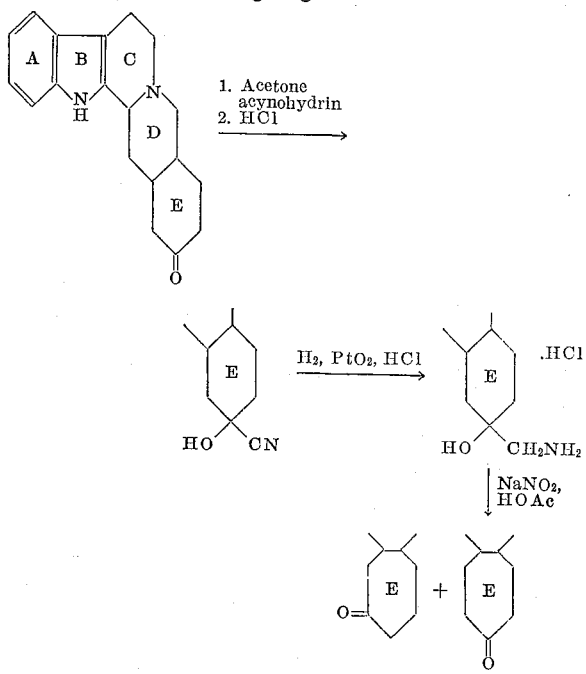

In order to further illustrate this invention, the following examples are given. All temperatures are given in degrees Centigrade with "overnight" referring to a period of about 18 to 20 hours.

EXAMPLE 1

*Yohimbone cyanohydrin, hydrochloride*

To a suspension of 88.2 g. yohimbone in 900 ml. anhydrous tetrahydrofuran is added 120 ml. acetone cyanohydrin and the mixture refluxed for three hours and then distilled at atmospheric pressure until 200 ml. distillate is collected. The residual solution is filtered to remove small amounts of insolubles and diluted with 900 ml. anhydrous tetrahydrofuran. A solution of 30 ml. concentrated hydrochloric acid in 200 ml. dry tetrahydrofuran is then added slowly with stirring at room temperature, whereupon an off-white precipitate is seen to form. The material is refrigerated overnight and the crude yohimbone cyanohydrin hydrochloride is collected, washed with dry tetrahydrofuran and dried at 80° in vacuo for four hours. The yield is 102 g., $[\alpha]_D^{25} = -8$ (95% aqueous methanol, c=0.85). The IR shows complete absence of carbonyl absorption. This material is sufficiently pure to be used as a starting material for further syntheses.

To a solution of 2 ml. acetone cyanohydrin in 100 ml. boiling methanol is added 10.2 g. crude yohimbone cyanohydrin hydrochloride. All of the solid dissolves immediately to give a red orange solution and in a few minutes the solid starts to crystallize from solution. The mixture is refluxed for an additional 10 minutes and then allowed to stand at room temperature overnight. The yield of yohimbone cyanohydrin hydrochloride in the form of white crystals is 6.6 g., M.P. 302–305° dec., $[\alpha]_D^{25} = -5$ (95% aqueous methanol, c=0.96). A sample on recrystallization from methanol melts at 303–306° dec., $[\alpha]_D^{25} = -3$ (95% aqueous methanol, c=0.71).

*Analysis* for $C_{20}H_{24}N_3OCl$.—Calcd.: C, 63.61; H, 7.45; N, 10.35; Cl, 8.74. Found: C, 63.76; H, 7.45; N, 10.35; Cl, 9.08.

EXAMPLE 2

*Yohimbone cyanohydrin base*

To a stirred solution of 10 g. once recrystallized yohimbone cyanohydrin hydrochloride in a mixture of 300 ml. methanol and 100 ml. water is added at room temperature a solution of 10 g. potassium cyanide in a mixture of 75 ml. methanol and 25 ml. water. The reaction mixture is stirred for 15 minutes longer and the precipitated solid is allowed to settle. It is collected by filtration, washed with water, washed with methanol, and then dried in vacuo at 80° for four hours to give 8.1 g. of yohimbone cyanohydrin base, M.P. 280–295° dec. (starts to darken at 200°) $[\alpha]_D^{25} = -13$ (pyridine, c=0.62). Infrared spectrum shows no carbonyl absorption.

EXAMPLE 3

*17-hydroxy-17-aminomethylyohimbane*

The recrystallized yohimbone cyanohydrin hydrochloride obtained from 29.4 g. yohimbone is suspended in 200 ml. methanol containing 10 ml. conc. hydrochloric acid and 20 ml. water and is hydrogenated at an initial pressure of 50 lb./sq. inch gauge using 3 g. platinum oxide as catalyst. The hydrogenation is discontinued after six hours at which time a very slow uptake of hydrogen beyond the calculated amount is still taking place. The catalyst is filtered off, the filtrate is neutralized by the addition of ammonium hydroxide, and the solvent is removed by distillation in vacuo. The resulting syrup is triturated with 250 ml. water, 50 ml. conc. ammonium hydroxide is added, and the mixture is stirred. The white precipitate which forms is collected by filtration, washed with water, sucked dry, and then dried over sulfuric acid in a vacuum dessicator. Paper chromatography shows the solid to contain three components. The solid is stirred and refluxed under nitrogen atmosphere with 200 ml. chloroform for ten minutes, the mixture is allowed to cool to room temperature, and the white insoluble solid is collected by filtration. It is washed with 25 ml. chloroform and dried in vacuo at 110° for 2 hours to give 11.2 g. of material, M.P. 200–206° dec., (darkens at 196°) $[\alpha]_D^{25} = -79$ (pyridine, c.=0.71). Paper chromatography shows it to be composed almost exclusively of the slowest moving component with a trace of the middle spot. Recrystallization from 50 ml. isopropanol containing 2 ml. water gives 7.4 g. of chromatographically pure 17-hydroxy-17-aminomethylyohimbane, M.P. 210–216° dec. (darkens at 195°), $[\alpha]_D^{25} = -85$ (pyridine, c.=0.65). Another recrystallization gives material, M.P. 212–216° dec. (darkens at 195°, $[\alpha]_D^{25} = -85$ (pyridine, c.=0.78).

Analysis for $C_{20}H_{27}N_3O$.—Calcd.: C, 73.81; H, 8.36; N, 12.91. Found: C, 73.80; H, 8.55; N, 12.74.

EXAMPLE 4

*Preparation of the homoyohimbones from pure 17-hydroxy-17-aminomethylyohimbane*

A solution of 4 g. sodium nitride in 20 ml. water is added with stirring to a solution of 6.5 g. 17-hydroxy-17-aminomethylyohimbane ($[\alpha]_D^{25} = -85°$ in pyridine) in 100 ml. 10% aqueous acetic acid which has been previously cooled to 10°. The temperature is maintained at 10° for 30 minutes and then the material is allowed to stand at room temperature, protected from light, for 18 hours. After this time, considerable solid amounts have separated from the solution and it can be demonstrated by ionophoresis that all of the aminomethyl compound has been converted. The reaction mixture is diluted with 150 ml. water, made strongly alkaline by the addition of ammonium hydroxide, and is extracted with chloroform. The chloroform solution is dried over sodium sulfate and distilled in vacuo to dryness. The residue is triturated with petroleum ether (30–60°) and the resulting crude solid is collected by filtration. It is stirred with 50 ml. isopropyl alcohol for two hours at room temperature and the resulting crystals are filtered off to give 4.1 g. of homoyohimbones, M.P. 182–205° dec. (starts to darken at 160°), $[\alpha]_D^{25} = -51$ (chloroform, c.=0.5), $[\alpha]_D^{25} = -77$ (pyridine, c.=0.56). Paper chromatography shows two spots of equal size. Recrystallization from methanol gives material, M.P. 183–205° dec. (darkens at 165°

$[\alpha]_D^{25} = -53$ (chloroform, c.=0.6), $[\alpha]_D^{25} = -76$ (pyridine, c.=0.72). Further recrystallization from methanol or isopropanol does not change the M.P., rotation, or behavior on paper chromatography.

Analysis for $C_{20}H_{24}N_2O$.—Calcd.: C, 77.88; H, 7.84; N, 9.08. Found: C, 77.69; H, 8.08; N, 8.88.

EXAMPLE 5

*Preparation of the homoyohimbones without isolation of the intermediate 17-hydroxy-17-aminomethylyohimbane*

The unrecrystallized yohimbone cyanohydrin hydrochloride obtained from 29.4 g. yohimbone is suspended in 200 ml. methanol containing 10 ml. conc. hydrochloric acid and 20 ml. water and is hydrogenated at an initial pressure of 50 lb./sq. inch gauge using 3 g. platinum oxide as catalysts. The hydrogenation is discontinued after six hours at which time a very slow uptake of hydrogen beyond the calculated amount is still taking place. The catalyst is filtered off, the filtrate is neutralized by the addition of ammonium hydroxide, and the solvent is removed by distillation in vacuo. The resulting yellow syrup is dissolved in 250 ml. 10% aqueous acetate acid, the solution is cooled to 10°, and 16 g. sodium nitrite dissolved in 50 ml. water is added with stirring. After maintaining the temperature at 10° for thirty minutes, the material is allowed to stand at room temperature protected from light for 18 hours. The reaction mixture is made strongly basic with ammonium hydroxide and is extracted with chloroform. The chloroform solution is dried over sodium sulfate, distilled in vacuo to dryness, and the residue is triturated with petroleum ether (30–60°) to give a dark amorphous solid. This is stirred with 120 ml. isopropanol at room temperature for two hours and the resulting crystals are filtered off to yield 12.2 g. of homoyohimbones without isolation of the intermediate 17-hydroxy-17-aminomethylyohimbane, $[\alpha]_D^{25} = -48$ (chloroform, c.=0.51), $[\alpha]_D^{25} = -79$ (pyridine, c.=0.51). Paper chromatography shows two spots of equal intensity.

EXAMPLE 6

*Separation of the homoyohimbones*

Recrystallization of 10 g. of the crystalline 50–50 mixture of homoyohimbones ($[\alpha]_D^{25} = -48$ in chloroform; $[\alpha]_D^{25} = -79$ in pyridine) from methyl ethyl ketone gives 2.1 g. (combined first two crops) of brownish white crystals which is shown by paper chromatography to consist almost exclusively of the faster moving component with only a trace of the slower moving isomer. One more recrystallization from methylethyl ketone followed by another from methanol gives 1.5 g. of pure fast-moving homoyohimbone, M.P. 217–225° dec. (darkens at 193°) $[\alpha]_D^{25} = -96$ (chloroform, c.=0.56), $[\alpha]_D^{25} = -113$ (pyridine, c.=0.68).

Analysis for $C_{20}H_{24}N_2O$.—Calcd.: C, 77.88; H, 7.84; N, 9.08. Found: C, 77.62; H, 7.80; N, 8.97.

The original methylethyl ketone filtrate is concentrated further to yield 1.7 g. of a third crop which is estimated from paper chromatography to contain about 70% of the fast-moving component and 30% of the slower moving one. The filtrate is distilled in vacuo to dryness and the residue is extracted by refluxing with four 250 ml. portions of absolute ether. The small amount of dark residue is discarded and the filtered ethereal solution is distilled to dryness. The residue is crystallized from isopropanol to give 3.5 g. of white crystals which contains only a trace of the fast moving component. Recrystallization from methanol gives 2.3 g. of pure slow-moving homoyohimbone, M.P. 177–185° (darkens at 165°) $[\alpha]_D^{25} = -6$ (chloroform, c.=0.53), $[\alpha]_D^{25} = -40$ (pyridine, c.=0.62).

Analysis for $C_{20}H_{24}N_2O$.—Calcd.: C, 77.88; H, 7.84; N, 9.08. Found: C, 77.82; H, 7.62; N, 9.22.

It is to be understood that the foregoing detailed description is given merely by way of illustration and that many variations may be made therein without departing from the spirit of our invention.

Having described our invention, what we desire to secure by Letters Patent is:

We claim:

1. A process for the production of compounds of the formula

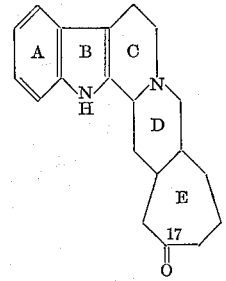

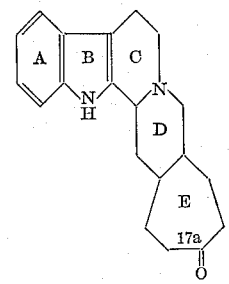

which comprises treating yohimbone with acetone cyanohydrin in the presence of hydrogen chloride to obtain yohimbone cyanohydrin hydrochloride, treating said yohimbone cyanohydrin hydrochloride with gaseous hydrogen under pressure in the presence of a hydrogenation catalyst to obtain 17-hydroxy-17-aminomethyl-yohimbone and treating said 17-hydroxy-17-aminomethylyohimbone with sodium nitrite in the presence of acetic acid.

2. 17-yohimbone cyanohydrin.
3. 17-hydroxy-17-aminomethylyohimbone.
4. 17-yohimbone cyanohydrin hydrochloride.

References Cited by the Examiner

UNITED STATES PATENTS 2,975,184   3/1961   Shavel _____ 260—289
3,202,663   8/1965   Albright et al. _____ 260—288

OTHER REFERENCES

Goldberg et al.: Helv. Chim. Acta., vol. 26 (1943), pages 288–291, 294–297.

Ercoli et al.: Gazz. Chim. Ital., vol. 88 (1958), pages 684–690.

WALTER A. MODANCE, *Primary Examiner.*

JAMES A. PATTEN, *Assistant Examiner.*